US011866972B2

(12) United States Patent
Gutierrez-Fernandez

(10) Patent No.: US 11,866,972 B2
(45) Date of Patent: Jan. 9, 2024

(54) TEMPORARY HOLDING DEVICE AND VEHICLE HINGE

(71) Applicant: Edscha Engineering GmbH, Remscheid (DE)

(72) Inventor: Jose-Manuel Gutierrez-Fernandez, Remscheid (DE)

(73) Assignee: EDSCHA ENGINEERING GMBH, Remscheid (DE)

(*) Notice: Subject to any disclaimer, the term of this patent is extended or adjusted under 35 U.S.C. 154(b) by 14 days.

(21) Appl. No.: 17/585,010

(22) Filed: Jan. 26, 2022

(65) Prior Publication Data

US 2022/0235592 A1 Jul. 28, 2022

(30) Foreign Application Priority Data

Jan. 26, 2021 (EP) .................................... 21153614

(51) Int. Cl.

| | |
|---|---|
| ***E05F 5/02*** | (2006.01) |
| ***E05D 11/06*** | (2006.01) |
| ***E05D 11/10*** | (2006.01) |
| ***E05D 5/06*** | (2006.01) |
| ***E05D 5/12*** | (2006.01) |

(52) U.S. Cl.

CPC .......... *E05D 11/1014* (2013.01); *E05D 5/062* (2013.01); *E05D 5/128* (2013.01); *E05Y 2900/531* (2013.01)

(58) Field of Classification Search

CPC ......... E05Y 2900/531; E05Y 2201/224; Y10T 16/61; E05D 5/062; E05D 5/128; E05D 11/1042; E05D 11/1014; E05D 11/1057; E05D 11/1085; E05F 1/1238

See application file for complete search history.

(56) References Cited

U.S. PATENT DOCUMENTS 2,259,821 A * 10/1941 Johnson .............. E05D 11/1014 16/375
6,070,296 A 6/2000 Abeln et al.
7,469,446 B1 * 12/2008 Brown ................ E05D 11/1057 16/334
2002/0174518 A1 * 11/2002 Gruber .................... E05D 5/121 16/261
2009/0307874 A1 * 12/2009 Anillo Crespo .......... E05D 5/12 16/380
2010/0186193 A1 * 7/2010 Brown ................ E05D 11/1042 16/334
2011/0083301 A1 4/2011 Folk et al.

FOREIGN PATENT DOCUMENTS

CN 204492417 U 7/2015
DE 3418891 A1 * 11/1985
DE 19652625 A1 6/1998

(Continued)

*Primary Examiner* — Chuck Y Mah

(74) *Attorney, Agent, or Firm* — Davidson, Davidson & Kappel, LLC

(57) ABSTRACT

A temporary retaining device for use in a vehicle hinge to temporarily lock a vehicle door in an open position relative to a door frame includes a flat portion in which an opening is arranged. A fold protrudes from an edge of the flat portion. A load arm extends from the flat portion. The load arm comprises a projection formed as a retaining lug on an end facing away from the flat portion.

20 Claims, 9 Drawing Sheets

(56) References Cited

FOREIGN PATENT DOCUMENTS

| | | | | | |
|---|---|---|---|---|---|
| EP | 0 653 536 | A2 | | 5/1995 | |
| EP | 653536 | A2 | * | 5/1995 | ......... E05D 11/1057 |
| FR | 2868804 | A1 | * | 10/2005 | ............. B62D 65/06 |
| FR | 2871833 | A1 | * | 12/2005 | ............. B62D 65/06 |
| FR | 2916471 | A1 | * | 11/2008 | ......... E05D 11/1014 |
| FR | 3009329 | A1 | * | 2/2015 | ......... E05D 11/1014 |
| FR | 3050477 | A1 | * | 10/2017 | ......... E05D 11/1014 |
| GB | 2440340 | A | * | 1/2008 | ........... E05C 21/005 |
| WO | WO-9714864 | A1 | * | 4/1997 | ........... E05C 17/045 |

* cited by examiner

TEMPORARY HOLDING DEVICE AND VEHICLE HINGE

The present disclosure relates to a temporary retaining device, in particular for use in a vehicle door hinge in order to temporarily hold a vehicle door in an open position. The present disclosure also relates to a vehicle hinge and to a retaining system using a temporary retaining device and a hinge.

BACKGROUND

During the manufacture of vehicles, the vehicle body and vehicle doors are typically painted together in a single process step after the vehicle doors have been mounted on the body. It is desirable to lock vehicle doors temporarily held in an open position so that specific painting work, e.g. a topcoat finish, can be performed.

CN 204 492 417 U describes a temporary retaining device for a vehicle hinge that fixes a first and a second hinge part. The retaining device comprises a removable flat portion for a stop part designed as a pin, which stop part is arranged on the first hinge part and is inserted during the painting of the vehicle body, including the vehicle doors that have already been installed, in order to lock the vehicle doors in a defined open position. With regard to a vehicle door to be locked, the flat portion is mounted on the second hinge part for this purpose, wherein a fold extending from the flat portion is inserted into a recess in the second hinge part so that it can be coupled. The flat portion comprises a total of two openings, one of which is penetrated by a temporary hinge bolt, which also penetrates the two hinge parts and connects them to one another in an articulated manner. The second opening of the flat portion is provided for the pin to snap into place. For this purpose, the flat portion has an upwardly bent, tongue-like ramp portion, which is arranged asymmetrically relative to the fold. In order to lock the vehicle door, it is pivoted so that the ramp portion contacts the pin and at the same time is guided up on the pin. Finally, the flat portion is displaced partially vertically upwards until the second opening snaps into place with the pin. From then on, the vehicle door is locked in an open position. However, it is disadvantageous that the hinge bolt can also be displaced upwards in the longitudinal direction thereof by the displacement or by a substantially vertical movement of the flat portion. In the worst case, the hinge bolt can come loose from a lower hinge eye of a hinge part, so that the two hinge parts of the vehicle door hinge are no longer fully coupled. As a result, the vehicle door can be damaged by uncontrolled pivoting. Therefore, an additional safety ring is mounted in a radial groove at the lower end of the hinge bolt, in order to prevent the hinge bolt from shifting in the longitudinal direction thereof. Once the painting work is complete, the temporary hinge bolt, the flat portion, and the safety ring are discarded. A permanent hinge pin is later inserted into the vehicle door hinge. Another disadvantage of this retaining device lies in the component tolerances. The pin, the openings of the flat portion, and the position of the flat portion specified by the hinge bolt or by the second hinge part make the retaining system, consisting of a retaining device and a vehicle hinge, susceptible to problems due to tolerance deviations, so that the functionality of the retaining device is unreliable.

US 2011 0083301 A1 shows a vehicle hinge which has a first hinge part having a fastening surface for connecting to a door or to a door frame, wherein the first hinge part comprising at least one cantilever in which a hinge eye is arranged. The vehicle hinge also has a second hinge part and a two-part hinge pin. In this case, the two-part hinge pin passes through the first hinge part and the second hinge part, so that the first hinge part and the second hinge part are connected to one another, so that they can pivot about an axis of rotation. Furthermore, a temporary retaining device can be attached on the vehicle hinge in order to temporarily lock the vehicle door in an open position relative to the door frame. In this case, the temporary retaining device comprises a flat portion in which an opening is arranged, wherein a resiliently yielding fold protrudes from an edge of the flat portion. Furthermore, the hinge pin passes through the opening of the temporary retaining device. In order to lock the vehicle door, the first hinge part has a retaining lug which can be engaged with the temporary retaining device in such a way that the fold fixes the retaining lug.

EP 0 653 536 A2 shows a vehicle hinge which has a first hinge part having a fastening surface for connecting to a door or to a door frame, wherein the first hinge part comprising at least one cantilever in which a hinge eye is arranged. The vehicle hinge also has a second hinge part and a first upper and a second lower hinge pin. In this case, the first upper and the second lower hinge pin pass through the first hinge part and the second hinge part, so that the first hinge part and the second hinge part are connected to one another, so that they can pivot about an axis of rotation. Furthermore, a temporary retaining device can be attached on the vehicle hinge in order to temporarily lock the vehicle door in an open position relative to the door frame. In a first embodiment, the temporary retaining device comprises a flat portion in which an opening is arranged, wherein a fold protrudes from an edge of the flat portion. Further, the opening of the temporary retaining device comprises a slot such that the temporary retaining device is clipped onto the upper hinge pin. In order to lock the vehicle door, the first embodiment of a temporary retaining device has a projection which can engage with a corresponding recess which is located within a hinge part. The second embodiment of a temporary retaining device comprises a flat portion in which an opening is arranged, wherein a fold protrudes from an edge of the flat portion, which fold is designed as a load arm. The temporary retaining device can be mounted on the lower hinge pin via the opening in the temporary retaining device. Furthermore, the load arm has a retaining lug facing the flat flat portion. In order to lock the vehicle door by means of the second embodiment of a temporary retaining device, the retaining lug of the temporary retaining device can engage with a corresponding recess which is located within a hinge part. The third embodiment of a temporary retaining device describes a modification of the second embodiment. In this case, the third embodiment of a temporary retaining device now has a flat surface which can be brought into contact with a flat surface section of a hinge part in order to lock a vehicle door.

DE 196 52 625 A1 shows a vehicle hinge which has a first hinge part having a fastening surface for connecting to a door or to a door frame, wherein the first hinge part comprising at least one cantilever in which a hinge eye is arranged. The vehicle hinge also has has a second hinge part and a first hinge pin and a second hinge pin. In this case, the first hinge pin and the second hinge pin pass through the first hinge part and the second hinge part, part, so that the first hinge part and the second hinge part are connected to one another, so that that they can pivot about an axis of rotation. Furthermore, a temporary retaining device can be be attached on the vehicle hinge in order to temporarily lock the vehicle door in an open position relative to the door frame.

In this case, the temporary retaining device comprises a flat portion in which an opening is arranged, wherein a fold protrudes from an edge of the flat portion. Furthermore, the first hinge pin passes through the opening of the temporary retaining device. In order to lock a vehicle door, the flat portion of the temporary retaining device has two projections which can engage with a corresponding recess which is located within the second hinge part. Thus, two retaining positions of the vehicle door are provided.

SUMMARY

It is an object of the present disclosure to provide a temporary retaining device and a vehicle hinge which is reliable, safe, and cost-efficient.

According to an aspect of the present disclosure, a temporary retaining device for use in a vehicle hinge to temporarily lock a vehicle door in an open position relative to a door frame is provided, comprising a flat portion in which an opening is arranged, wherein a fold protrudes from an edge of the flat portion. The retaining device is characterized in that a load arm extends from the flat portion, and that the load arm has a projection configured as a retaining lug at an end facing away from the flat portion. The retaining device can be coupled in a simple manner to a hinge part of a vehicle hinge in order to specify a preferred opening angle of a door coupled to the vehicle via the hinge. The retaining device is easy to manufacture and in particular allows the hinge parts to be reliably fixed relative to one another without complicated threading in or out being necessary for this purpose. In this case, the functions of securing the hinge parts against pivoting in one direction and in the other direction are advantageously decoupled, so that the retaining device can also be disengaged again without being destroyed.

The retaining lug expediently comprises on the one hand a flat counter-surface and a guide bevel on the other. The counter-surface is intended to come into clamping or gripping engagement with an end face of a stop part arranged on a hinge part and accordingly to provide a fixation that sets the preferred opening angle with a at least torque to be overcome. In this case, the retaining lug is expediently provided outside the plane of the load arm and is supported by a guide bevel which can be designed as a bulbous projection of the load arm. As a result, the torques can be transmitted in a particularly favorable manner.

The load arm is expediently elastically bendable in a radial direction so that an impact is cushioned when a torque occurs in a direction of the outer surface of the load arm.

According to a favorable embodiment, it is provided that a free end of the load arm has an arcuate portion, which portion thus advantageously defines a guide bevel which facilitates pivoting past the stop part arranged on the hinge side.

The fold is expediently designed as a surface of the flat portion that is folded over by approximately 90°. However, it is possible to form the fold in the form of steps or, preferably, in the form of waves. The fold serves in particular to come into flat contact with the complementarily shaped end face of a hinge part.

The flat portion preferably has at least one bead which is provided for stiffening and stabilizing the flat portion and which also ensures elastic deformability so that the flat portion can be adapted to tolerances of the hinge part to which it is to be connected. At the same time, the bead also makes it easier to remove the temporary retaining device after use.

The load arm is preferably designed in such a way that during the elastical shifting of the load arm in the radial direction, relatively low stresses occur inside the load arm, wherein the load arm having a high degree of rigidity, particularly in the tangential direction, which makes it possible to apply a torque in a range of 2 Nm to 20 Nm by means of the retaining lug, without buckling or bending of the load arm occurring.

In a favorable embodiment, it is provided that the retaining device is formed in one piece from a single piece of material. A sheet steel that is shaped by stamping and is thin-walled and at the same time elastic is particularly suitable for this purpose.

According to an advantageous development, it is provided that the load arm has a contact surface which is provided adjacently to the retaining lug for interaction with a stop part which is arranged on one of the hinge parts. In particular, the contact surface limits the pivoting in one direction, while the retaining lug limits the pivoting in the other direction by clamping. In this respect, the retaining lug is connected to the stop in a frictionally or force-fitting manner, while the contact surface prevents further opening in a form-fitting manner. The contact surface thus limits the pivoting movement in the opening direction, while the retaining lug prevents the pivoting movement in the closing direction.

According to an aspect of the present disclosure, a vehicle hinge is provided, comprising a first hinge part having a fastening surface for connecting to a door or to a door frame, and at least one cantilever in which a hinge eye is arranged, wherein a stop part is arranged on a surface of the cantilever, a second hinge part, and a hinge pin which passes through the first and second hinge part and connects the first and second hinge part to one another, so that they can pivot about an axis of rotation. The vehicle hinge is preferably characterized in that the stop part is designed as a U-shaped bracket having two legs and a base connecting the legs, each of which protrudes from the cantilever. The vehicle hinge thus advantageously provides a stop part that can be connected to the cantilever in a simple manner and provides a number of surfaces to which different functions can be assigned. By providing the flat legs and also the base, some defined positions are thus specified that allow flat contact, which prevents bending or buckling when the aforementioned contact surface of the retaining device is applied, for example. The U-shaped bracket provides a large surface area without increasing the mass of the stop part. In particular, the bracket bent in a U-shape makes it possible for different outwardly facing surfaces of the legs or the base to interact with different parts and in each case to provide defined opening angles for the door to be attached via the vehicle hinge.

The stop part expediently limits the pivoting movement of the hinge parts and defines a maximum opening angle of the hinge. For this purpose, a cantilever of the second hinge part abuts against the stop part, preferably at its base, which ensures that the vehicle door does not roll over.

It is particularly favorably provided that the legs of a preferably U-shaped stop part run approximately parallel to the fastening surface of the first hinge part, so that the load arm can be guided past the U-shaped bracket without tilting.

One of the legs of the U-shaped bracket expediently has an end face facing away from the base, which is designed to interact with the retaining lug of a temporary retaining device, as described above. For this purpose, the end face is designed to be smooth, so that the retaining lug comes into contact with the end face under the prestressing of the load arm. The end face can be formed by flat projections on the stop part or on the U-shaped bracket. These can be realized in the structural design of the stop part or the U-shaped bracket, for example by a choice of flat or angled sheets or profiles, for example square profiles. Alternatively, it is possible for the retaining lug to also engage in the intermediate space between the two legs through the opening of the U facing away from the base, and thus also to provide a form fit instead of or in addition to the frictional fixing. If the door is moved in the closing direction with a moment that, for example, exceeds 20 Nm, the retaining lug is decoupled without the need for manual processing of the retaining device.

According to an alternative embodiment, it is provided that the base of the U-shaped bracket is arranged on the cantilever, and a passage is arranged between the legs of the U-shaped bracket, which runs transversely, preferably at an angle of up to 45°, to a plane to the fastening surface. Advantageously, the passage of the U-shaped bracket offers a possibility to use a defined adapter piece in this passage.

The angle is in a range between 5° and 25°, preferably between 7° and 15°, and particularly preferably the angle is approximately 10° in order to advantageously lock a vehicle door at a defined opening angle.

According to an aspect of the present disclosure, a retaining system for an automobile bodyshell to be painted is provided, comprising a hinge as described above, and a retaining device as described above, wherein, instead of the hinge pin of the hinge, a provisional hinge bolt couples the hinge parts in a pivotable manner and, moreover, the retaining device connects to the second hinge part, wherein the retaining lug of the cantilever of the retaining device can be braced on the leg of the bracket, in particular on its front side, or on an adapter piece connected to the bracket, in order to lock the two hinge parts in a predetermined opening angle. This advantageously ensures that the bodyshell having the doors already connected can go through the painting processes without the doors being unintentionally closed during the painting work. In this way, the doors and the bodyshell are advantageously fully provided with a paint coating, for example by means of the topcoat painting.

After painting, the provisional hinge bolt and retaining device are discarded or recycled, and when the doors are reconnected to the body, the actual hinge pin is used for the pivotal connection.

The fold of the retaining device can expediently be coupled to the second hinge part and can preferably be fixed in a corresponding recess. Due to the angle that the fold and the flat portion have to one another, favorable bracing occurs on the second hinge part.

The retaining device and the second hinge part preferably have the same axis of rotation. For this purpose, it is provided in particular that the opening of the flat portion and the hinge eye of the cantilever of the second hinge part, to which the retaining device is connected, are aligned with one another.

A retaining force generated by the retaining device in order to temporarily lock a vehicle door in the open position preferably has a torque of 2 Nm to 20 Nm, preferably 10 Nm to 18 Nm, particularly preferably 15 Nm to 17 Nm. This ensures that vibrations during transport of the bodyshell to be painted, which are insufficient to close the vehicle door locked in the open position by the retaining device, so that a high level of reproducibility in painting work is ensured.

According to a preferred embodiment, it is provided that an adapter piece designed as a double-bent sheet metal part is inserted with its central region between the legs of the U-shaped bracket, and that the retaining lug can be connected to an outer part of the double-angled sheet metal part. Advantageously, different adapter pieces with, for example, differently defined stop surfaces and geometries or different materials can be inserted into the U-shaped bracket in order to ensure, for example, much higher torques for locking a vehicle door. This aspect increases the flexibility and range of use of the retaining system.

BRIEF SUMMARY OF THE DRAWINGS

The present disclosure is explained in more detail below with reference to the accompanying drawings using a preferred embodiment.

DETAILED DESCRIPTION

Figure 1:
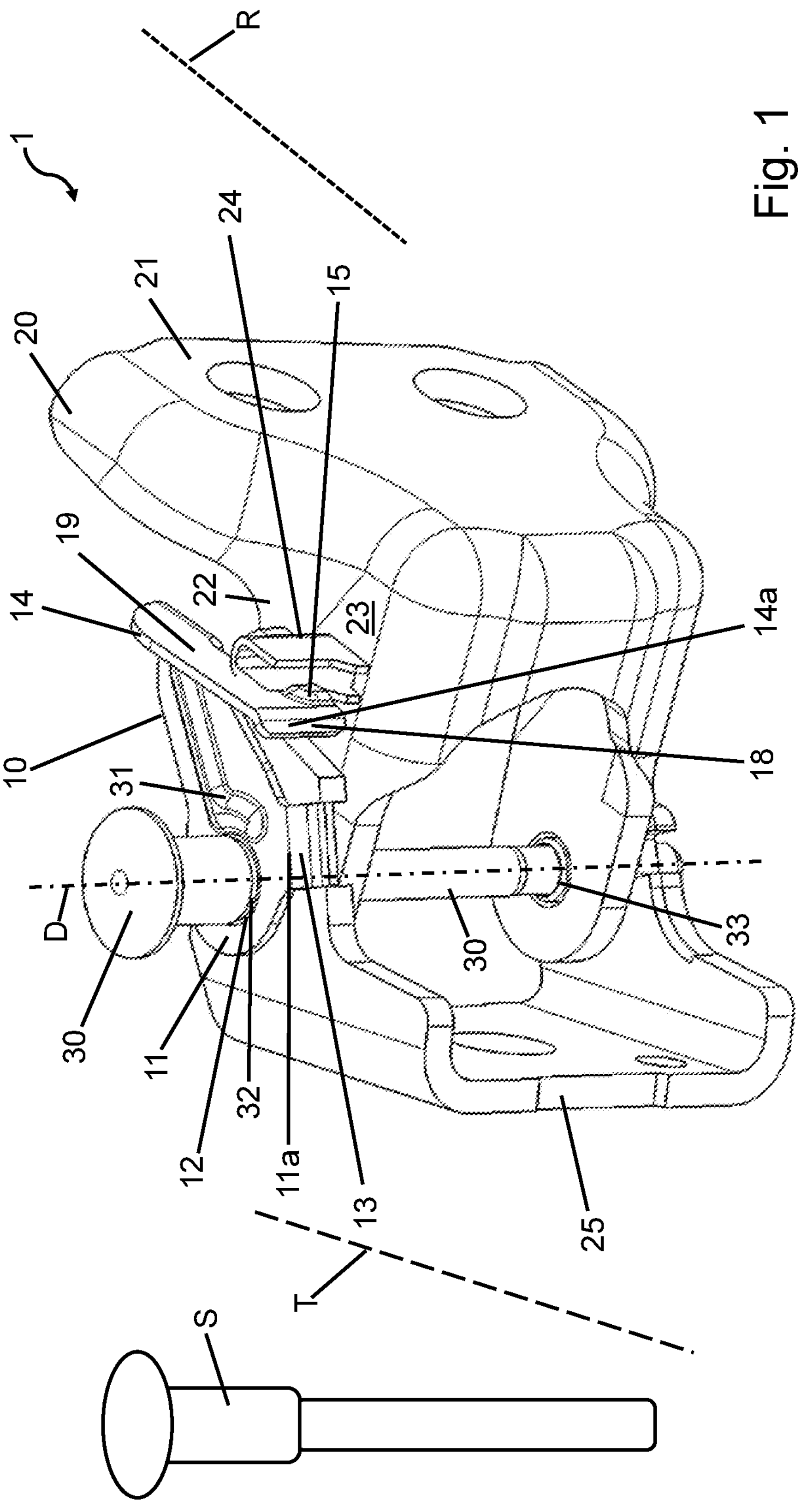
FIG. 1 is a perspective schematic view of a temporary retaining device according to the present disclosure mounted in a vehicle hinge.

FIG. 1 shows a vehicle hinge 1 which comprises a first hinge part 20 and a second hinge part 25. The first hinge part 20 is mounted with a fastening surface 21 on a door frame R (shown as a broken line), so that consequently the second hinge part 25 is mounted on a vehicle door T (also shown as a broken line). It is possible that the second hinge part 25 is connected to the door frame R, and the first hinge part 20 is connected to the vehicle door T.

A stop part 24, which is designed as a U-shaped bracket 24 made of sheet steel, is arranged on the first hinge part 20 on a surface 23 of the cantilever 22.

The retaining device 10, which is also made from sheet steel, comprises a flat portion 11 which has an opening 12. The retaining device 10 is positioned on the second hinge part 25 such that the opening 12 is aligned with the hinge eye 32 of the second hinge part 25, and the flat portion 11 of the retaining device 10 is positioned flat on the second hinge part 25. A temporary hinge bolt 30 engages both through the opening 12 of the retaining device 10 and through the two hinge parts 20 and 25, after which the first and the second hinge part 20 and 25 and the retaining device 10 are connected to one another in an articulated manner, so that they can pivot about an axis of rotation D. So that the retaining device 10 can always follow the rotary movement about the axis of rotation D of the second hinge part 25 evenly, the retaining device 10 has a coupling element designed as a fold 13. The fold 13 extends in the form of a step or a wave from an edge 11*a* of the flat portion 11 of the retaining device 10. The fact that the second hinge part 25 has a corresponding recess which is adapted to the shape of the fold 13 in a form-fitting manner makes it possible to insert the fold 13 in the recess of the second hinge part 25 and finally form a non-rotatable coupling or interaction of the retaining device 10 with the second hinge part 25.

The retaining device 10 also comprises a load arm 14 which extends from the flat portion 11 of the retaining device 10. A free end 14*a* of the load arm 14 has, on the one hand, a lateral projection designed as a retaining lug 15 and, on the other hand, an arcuate portion 18. In addition, the load arm 14 has a lateral contact surface 19.

Figure 2:
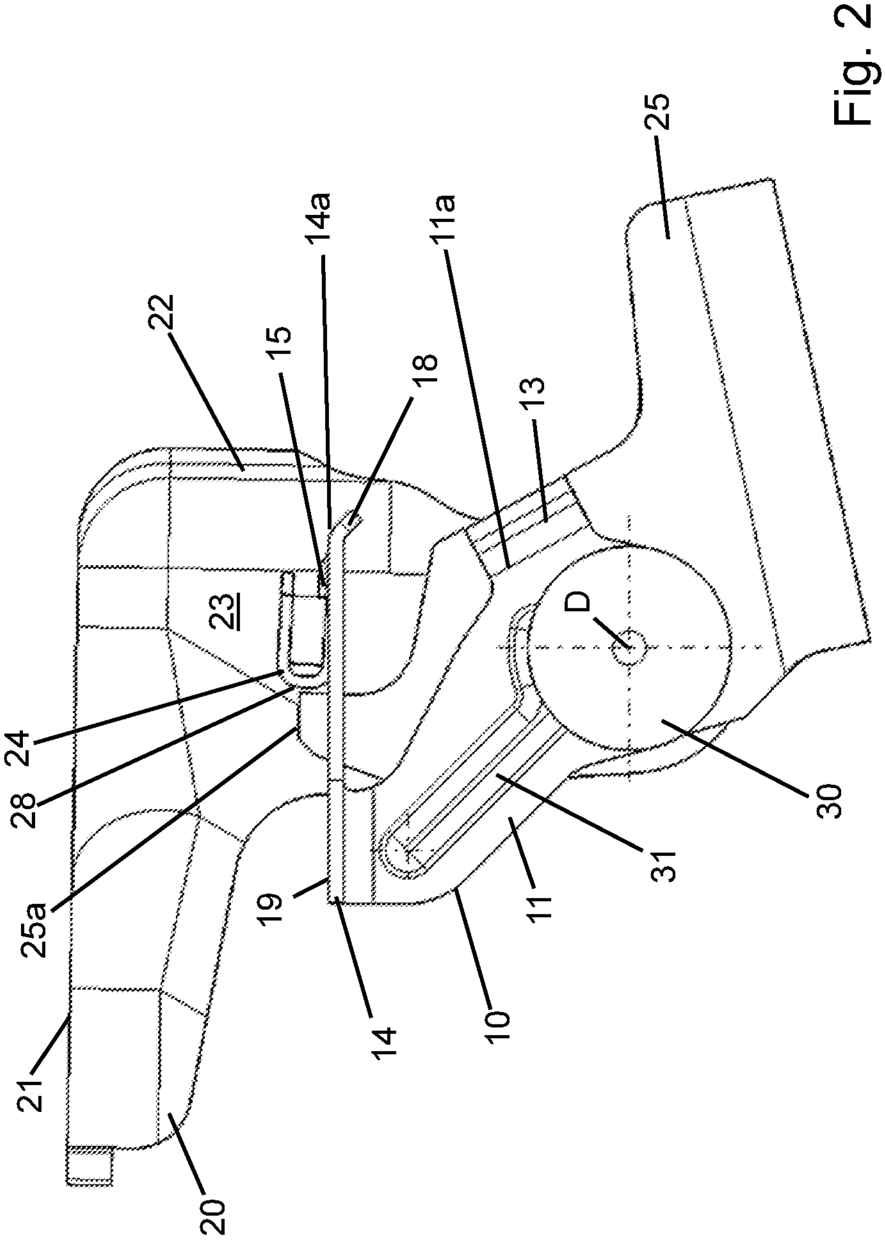
FIG. 2 is a perspective schematic view from above of the retaining device from FIG. 1.

In FIG. 2, the vehicle hinge 1 is shown with the built-in retaining device 10 from a bird's eye view. In the case of a rotation in the clockwise direction of the second hinge part 25 about the axis of rotation D, the load arm 14 is guided tangentially past the stop part 24, wherein the lateral stop surface 19 of the load arm 14 contacts a leg 26 of the stop part 24 until the second hinge part 25 is stopped with its stop 25*a* via a base 28 of the stop part 24. Due to the elastic properties of the load arm 14 which is elastically bendable in the radial direction along its longitudinal axis, and due to the correspondingly designed guide bevel 17 of the retaining lug 15, a tilting movement of the free end 14*a* of the load arm 14 is prevented with the stop part 24 in the region of the base 28 in the case of a rotation in the clockwise direction. Furthermore, a bead 31 is introduced within the flat portion 11 of the retaining device 10 in FIG. 2 in order to provide the retaining device 10 with a specific stability and rigidity.

Figure 3:
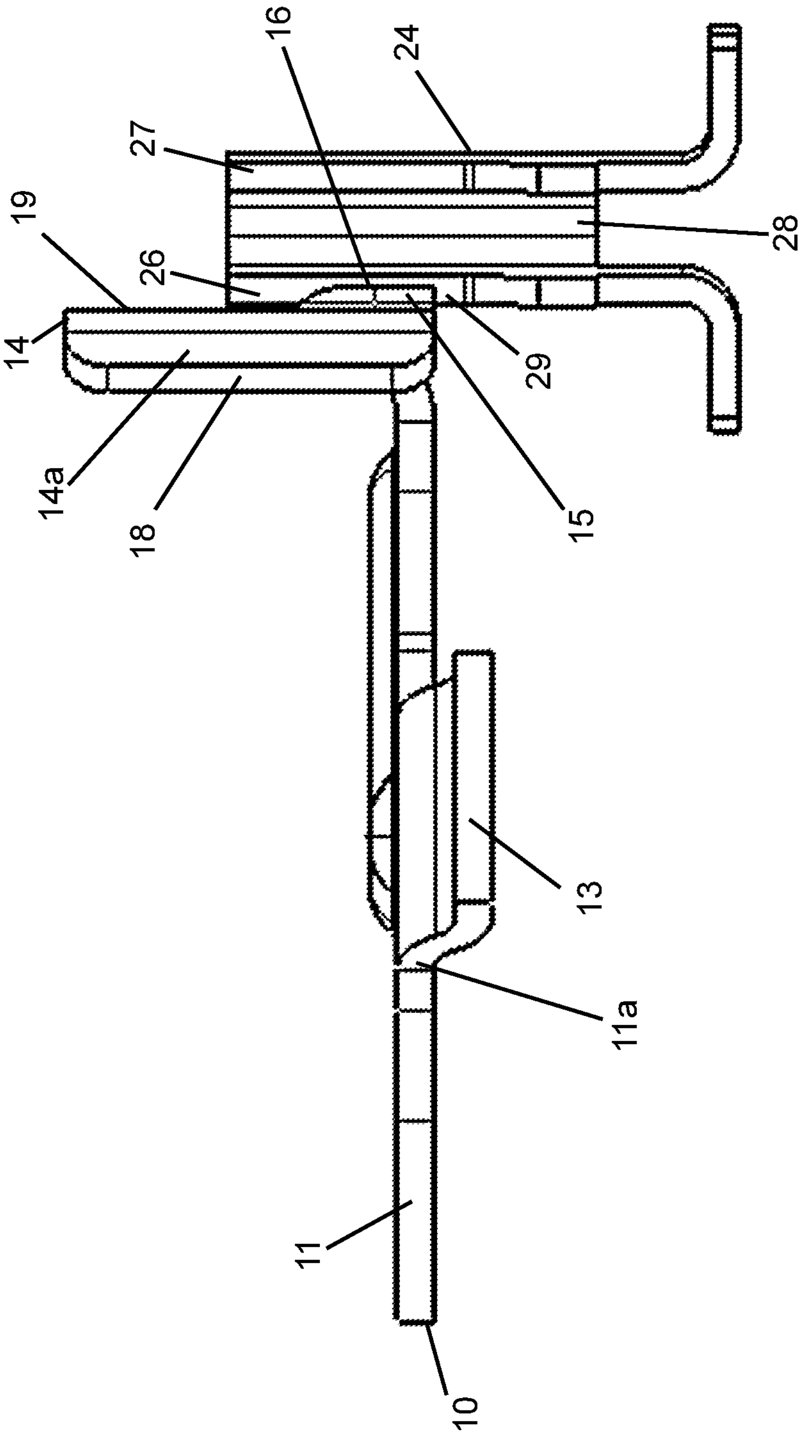
FIG. 3 is a front view of the temporary retaining device and the stop part or the U-shaped bracket.

FIG. 3 shows a front view of the retaining device 10 and the stop part 24 in a locked position. It can be seen that the retaining device 10 has a flat portion 11 from which the load arm 14 extends upwards. The retaining lug 15 of the load arm 14 acts orthogonally on a counter-surface 29 of the stop part 24 in order to ensure that the hinge 1 is locked in a functional manner.

Figure 4:
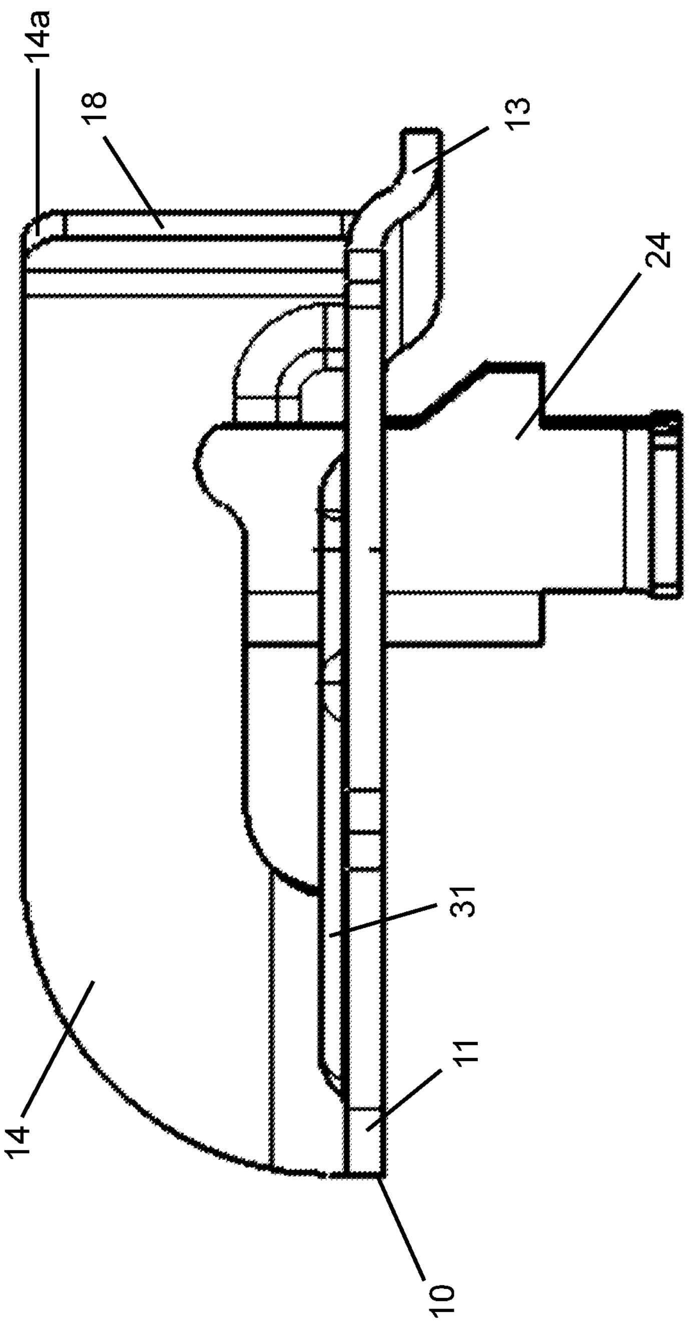
FIG. 4 is a side view of the retaining device from FIGS. 1 to 3.

FIG. 4 shows a side view of the retaining device 10 starting from the flat portion 11. The stop part 24 is visible behind the load arm 14 or behind the flat portion 11.

Figure 5:
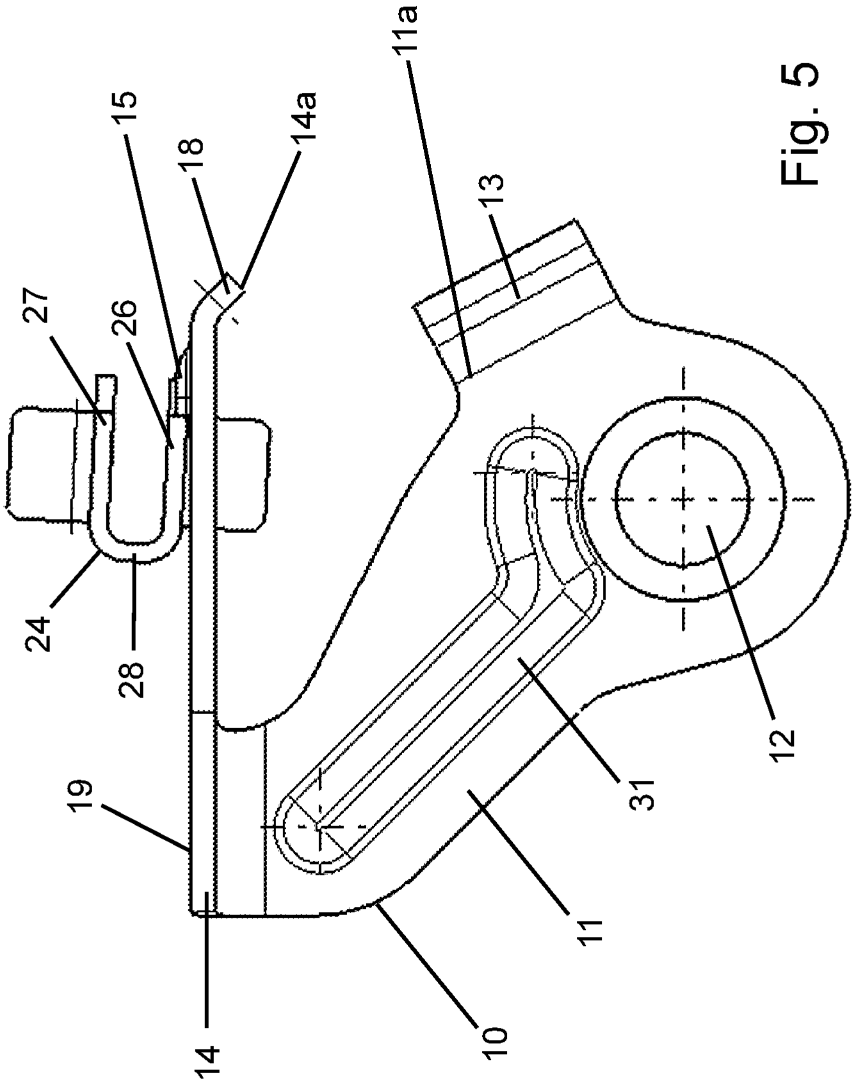
FIG. 5 is a view from above of the retaining device and the stop part or the U-shaped bracket.

FIG. 5 substantially corresponds to FIG. 2. The two hinge parts 20 and 25 and the hinge bolt 30 are not shown in FIG. 5. The retaining device 10 and the stop part 24 are shown in a view from above, with the retaining device 10 and the stop part 24 being in a locked position. Because the hinge bolt 30 is not shown, the opening 12 of the retaining device 10 is now visible.

Figure 6:
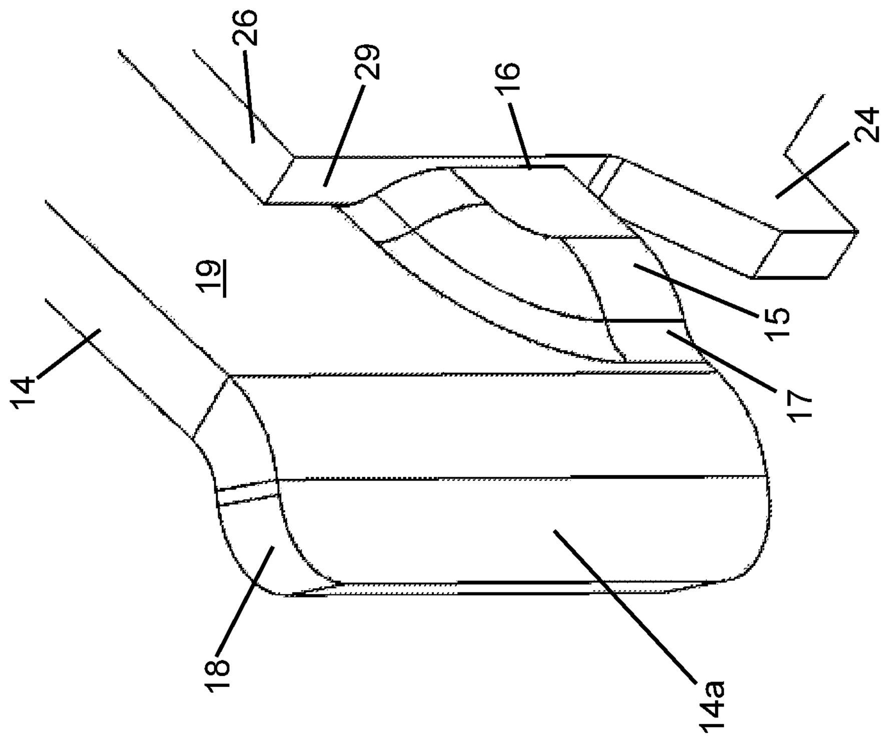
FIG. 6 shows a detail from FIG. 1, in which the interaction of retaining lug and bracket is shown enlarged.

FIG. 6 is an enlarged view of the free end 14*a* of the load arm 14 in interaction with the stop part 24. The retaining lug 15 comprises a guide bevel 17, which is designed laterally as a ramp or as a convex or rounded elevation, and a flat counter-surface 16, which interacts with the preferably sharp-edged end face 29 of the stop part 24 and correspondingly locks the hinge parts 20 and 25. In addition, the load arm 14 comprises an arcuate portion 18 so that the load arm 14 does not cant when passing the base 28 of the stop part 24 but rather can be tangentially guided past the U-shaped bracket 24. At this time, the load arm 14 is slightly elastically bent in the direction of the hinge bolt 30 by the stop part 24. As soon as the retaining lug 15 has passed the stop part 24 in the case of a rotation in the clockwise direction relative to FIG. 2, the load arm 14 springs back elastically into its starting position, so that the contact surface 16 interacts with the end face 29. Finally, in this way, the second hinge part 25 or the vehicle door T is locked in a defined, open position on the one hand by the retaining device 10 and on the other hand by the first end stop 25*a*. In this way, a vehicle door T can be held in an open position by the temporary retaining device 10 with a torque of 2 Nm to 20 Nm.

A torque greater than 20 Nm is required to release the lock. In this case, the second hinge part 25 is rotated in a counterclockwise direction about the axis of rotation D relative to FIG. 2, so that the load arm 14 is in turn elastically deflected in the direction of the hinge bolt 30. As a result of this radial shifting of the load arm 14, the retaining lug 15 and the stop part 24 are disengaged, so that the locking of the temporary retaining device 10 is released. Due to the advantageous geometry of the retaining device 10, when the retaining device 10 is fixed and released with the stop part 24, the load arm 14, almost exclusively, is radially elastically bent or displaced, so that the flat portion 11 of the retaining device 10 always remains immovable and at a low stress level on the second hinge part 25. This has the advantage that the hinge bolt 30 is not displaced along its longitudinal axis, so that it is not necessary to attach a security element to the lower end of the hinge bolt 30.

Once the painting work is finished, the temporary hinge bolt 30 and the retaining device 10 are, for example, discarded. In order to permanently connect the two hinge parts 20 and 25, a permanent hinge pin S is then inserted into the hinge eyes 32 and 33 of the hinge parts 20 and 25 and then riveted, whereby the vehicle hinge is completed. The stop part 24 accordingly remains permanently on the first hinge part 20 since it also serves to limit the opening angle of a vehicle door T by means of the base 28.

Figure 7:
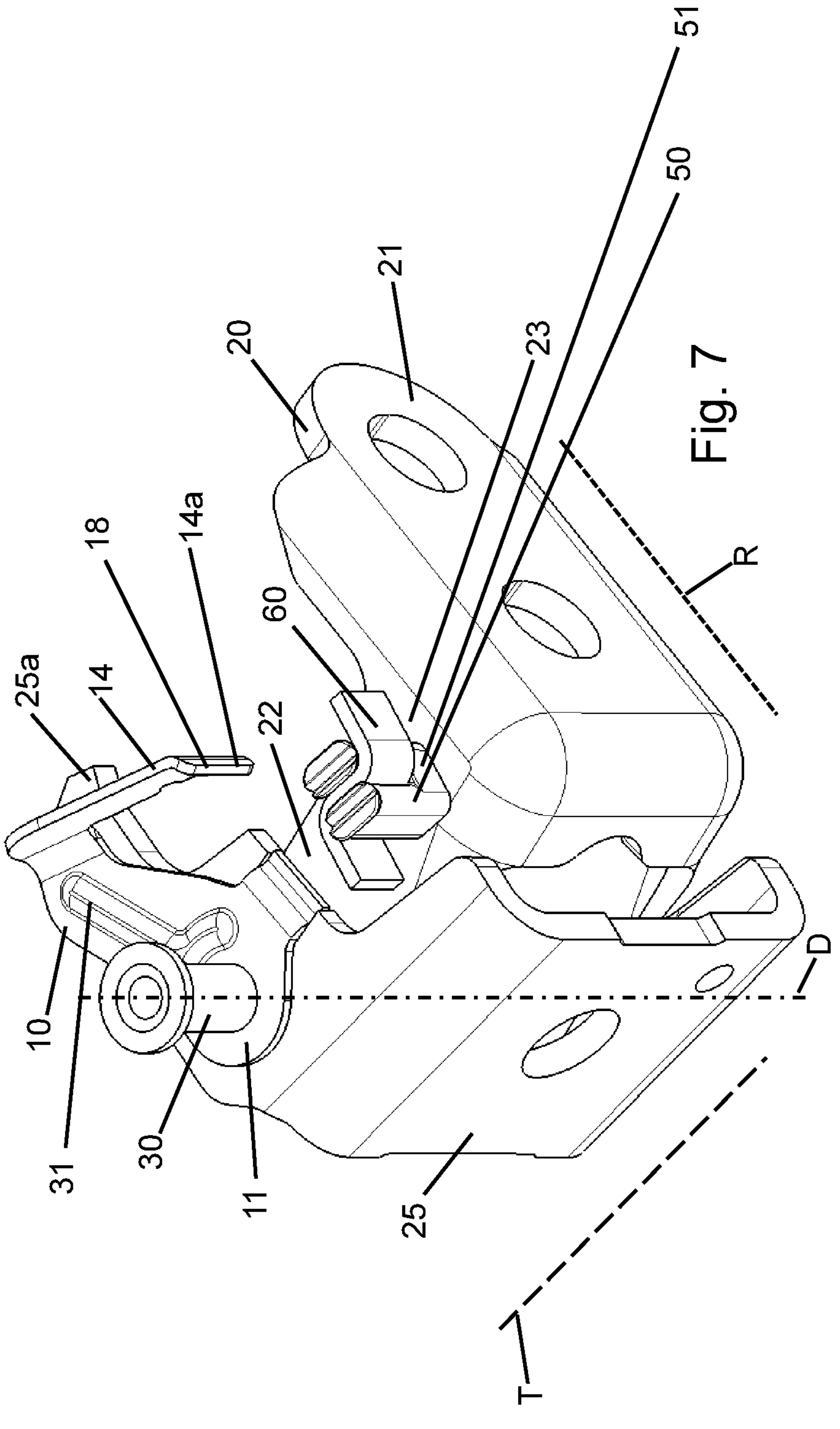
FIG. 7 is a perspective schematic view of an alternative embodiment of a temporary retaining device mounted in a vehicle hinge.
Figure 8:
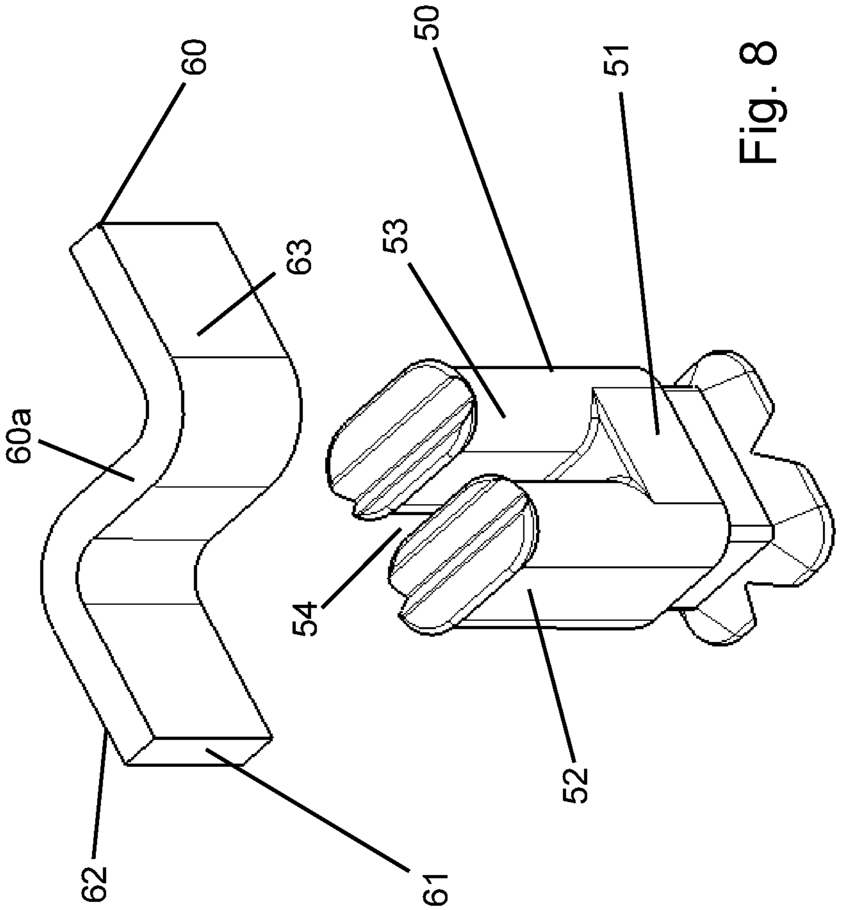
FIG. 8 is a perspective individual view of an alternative embodiment relative to the stop part and the adapter piece.

FIG. 7 shows another preferred embodiment of a temporary retaining device, in which the same or structurally comparable parts are provided with the same reference signs. In the following, therefore, only the differences will be discussed.

Figure 9:
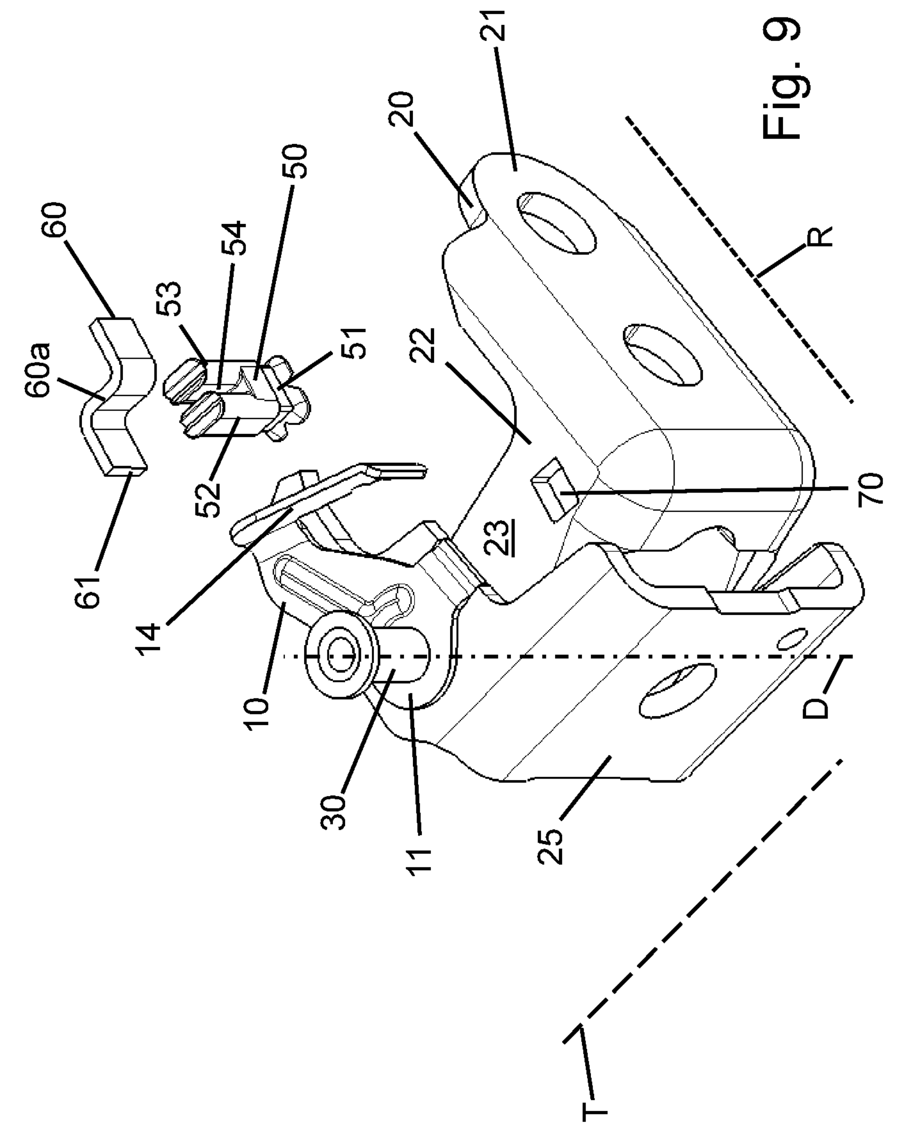
FIG. 9 is an exploded perspective view of the alternative embodiment of FIG. 7.

On the surface 23 of the cantilever 22 of the first hinge part 20, an alternative variant of a U-shaped bracket 50 or a stop part 50 made of a steel material is arranged. The U-shaped bracket 50 comprises a base 51 from which two parallel legs 52 and 53 extend upwards in the vertical direction. FIGS. 7 and 9 show that the base 51 of the U-shaped bracket 50 is inserted with its side facing away from the legs 52 and 53 in a complementary, rectangular opening 70 which is arranged inside the cantilever 22. The opening 70 is arranged transversely in its longitudinal direction at an angle of approximately 10° to the fastening portion 21 of the first hinge part 20.

The U-shaped bracket 50 has a passage 54 between the two parallel legs 52 and 53. Due to the angled arrangement of the opening 70 or the U-shaped bracket 50 inserted in the opening 70, the passage 54 also has an angle of approximately 10° relative to the fastening portion 21 of the first hinge part 20.

An S-shaped adapter piece 60 made of sheet steel is inserted in the passage 54 in such a way that its central region 60*a* is located in a clamping manner within the passage 54 of the U-shaped bracket 50. The side surface 63 of the adapter piece 60 points in the direction of the fastening portion 21, and the side surface 62 of the adapter piece 60 points in the direction of the hinge bolt 30.

It can be seen in FIG. 7 that the adapter piece 60 is an S-shaped component, which is inserted into the passage 54 from above in such a way that the two side surfaces 62 and 63 of the adapter piece 60 are arranged approximately parallel with respect to the fastening surface 21.

The adapter piece 60 can be inserted into any stop part 50 which is equipped with a passage 54 designed as a channel.

Furthermore, the temporary retaining device 10 has both the same geometry and the same properties relative to the retaining system in both embodiments.

In contrast to the first embodiment, the alternative U-shaped bracket 50 does not have a stop surface for interaction with the load arm 14. Instead, an end face 61 is designed on a free end of the adapter piece 60 in order to lock the two hinge parts 20 and 25 together with the retaining lug 15 of the load arm 14. The end face 61 of the adapter piece 60 is in a parallel plane relative to the central region 60*a*. In order to lock a vehicle door T, the second hinge part 25 is pivoted together with the retaining device 10 about the axis of rotation D in a clockwise direction relative to FIG. 7. The arcuate portion 18 of the load arm 14 passes the side surface 62 of the adapter piece 60. During this process, the load arm 14 and the adapter piece 60 are elastically bent in the radial direction. As soon as the retaining lug 15 of the load arm 14 has passed the end face 61 of the adapter piece 60, the retaining lug 15 abuts orthogonally against the end face 61 of the adapter piece 60. The interaction of the retaining lug 15 with the end face 61 locks the hinge in a clamping manner.

The locking is released by pivoting the second hinge part 25 in a counterclockwise direction relative to FIG. 7. Insofar as a certain torque, for example higher than 20 Nm, is applied for the pivoting movement in the counterclockwise direction, the load arm 14 is in turn elastically bent in the radial direction. The shifting of the load arm 14 and the rotary movement of the second hinge part 25 disengages the retaining lug 15 from the stop face 61 of the adapter piece 60 so that the locking by the retaining device 10 is canceled.

As soon as the painting work is completed, the temporary hinge bolt 30 and the retaining device 10 and, if necessary, the adapter piece 60 are, for example, discarded. However, it is also possible to leave the adapter piece 60 in the bracket 50. In order to permanently connect the two hinge parts 20 and 25, a permanent hinge pin S is then inserted into the hinge eyes 32 and 33 of the hinge parts 20 and 25 and then riveted, whereby the vehicle hinge is completed. Accordingly, the U-shaped bracket 50 remains permanently on the first hinge part 20 since it also serves to limit the opening angle of a vehicle door T by means of the base 51. For this purpose, the U-shaped bracket 50 is riveted to the hinge part 20 in the embodiment shown.

What is claimed is:

1. A temporary retaining device for use in a vehicle hinge to temporarily lock a vehicle door in an open position relative to a door frame, the temporary retaining device comprising:

a flat portion in which an opening is arranged;

a fold protruding from an edge of the flat portion; and a load arm extending from the flat portion, wherein the load arm comprises a projection formed as a retaining lug on an end facing away from the flat portion, and wherein the load arm is bent by approximately a right angle with respect to the flat portion.

2. The temporary retaining device according to claim 1, wherein the retaining lug comprises a flat counter-surface and a guide bevel.

3. The temporary retaining device according to claim 1, wherein the load arm is elastically bendable in a radial direction.

4. The temporary retaining device according to claim 1, wherein a free end of the load arm comprises an arcuate portion.

5. The temporary retaining device according to claim 1, wherein the fold is configured as a step or a wave.

6. The temporary retaining device according to claim 1, further comprising at least one bead is arranged in the flat portion.

7. The temporary retaining device according to claim 1, wherein the temporary retaining device is formed in one piece from a single piece of material.

8. The temporary retaining device according to claim 1, wherein the load arm comprises a contact surface which is provided adjacently to the retaining lug for interaction with a stop part.

9. The temporary retaining device according to claim 1 wherein a projection of the load arm on a plane of the flat portion defines an acute angle with respect to the flat portion.

10. A vehicle hinge comprising a first hinge part having a fastening surface for connecting to one of a door and a door frame, wherein the first hinge part comprises at least one cantilever in which a hinge eye is arranged, wherein a stop part is arranged on a surface of the cantilever, a second hinge part; and a hinge pin which passes through the first hinge part and the second hinge part and connects the first hinge part and the second hinge part to one another, so that the first hinge part and the second hinge part are pivotable about an axis of rotation, wherein the stop part comprises two legs and a base connectiong the legs protruding from the cantilever.

11. The vehicle hinge according to claim 10, wherein the stop part is configured as a U-shaped bracket comprising two legs and a base connecting the two legs.

12. The vehicle hinge according to claim 11, wherein the legs run approximately parallel to the fastening surface of the first hinge part, and wherein one of the two legs of the U-shaped bracket comprises an end face facing away from the base, wherein the end face is configured to interact with a retaining lug of a temporary retaining device.

13. The vehicle hinge according to claim 11, wherein the U-shaped bracket is arranged with the base of the U-shaped bracket on the cantilever, and wherein a passage is arranged between the two legs of the U-shaped bracket, wherein the passage runs transversely at an angle to a plane of the fastening surface.

14. A retention system for an automobile bodyshell to be painted, the retention system comprising:

an automotive hinge comprising:

a first hinge part having a fastening surface for connecting to one of a door and a door frame, wherein the first hinge part comprises at least one cantilever in which a hinge eye is arranged, wherein a stop part is arranged on a surface of the cantilever;

a second hinge part; and a hinge bolt which passes through the first hinge part and the second hinge part and connects the first hinge part and the second hinge part to one another, so that the first hinge part and the second hinge part are pivotable about an axis of rotation, wherein the stop part comprises a bracket with two legs protruding from the cantilever, a temporary retaining device for use in the automotive hinge to temporarily lock a vehicle door in an open position relative to a door frame, the temporary retaining device comprising:

a flat portion in which an opening is arranged;

a fold protruding from an edge of the flat portion; and a load arm extending from the flat portion, wherein the load arm comprises a projection formed as a retaining lug on an end facing away from the flat portion, wherein the hinge bolt pivotably couples the hinge parts and connects the retaining device to the second hinge part, and wherein the retaining lug is braceable on at least one of said legs of the bracket or an adapter piece connected to the bracket in order to lock the first and second hinge parts in a predetermined opening angle.

15. The retention system according to claim 14, wherein the fold is coupleable to the second hinge part, and wherein the retaining device and the second hinge part have a same axis of rotation.

16. The retention system according to claim 14, wherein a retaining force generated by the retaining device in order to temporarily lock a vehicle door in an open position has a torque of 2 Nm to 20 Nm.

17. The retention system according to claim 14, wherein the stop part is formed by the bracket, the bracket being a U-shaped bracket comprising two legs and a base connecting the two legs.

18. The retention system according to claim 17, wherein the adapter piece is configured as a double-bent sheet metal part inserted with a central region thereof between the two legs of the U-shaped bracket, and wherein the retaining lug is connectable to an outer part of the double-bent sheet metal part.

19. The retention system according to claim 14, wherein the projection engages the stop part to temporarily lock the vehicle door in an open position relative to the door frame.

20. The retention system according to claim 14, wherein the load arm comprises a contact surface which is provided adjacently to the retaining lug for interaction with the stop part.

* * * * *